UNITED STATES PATENT OFFICE.

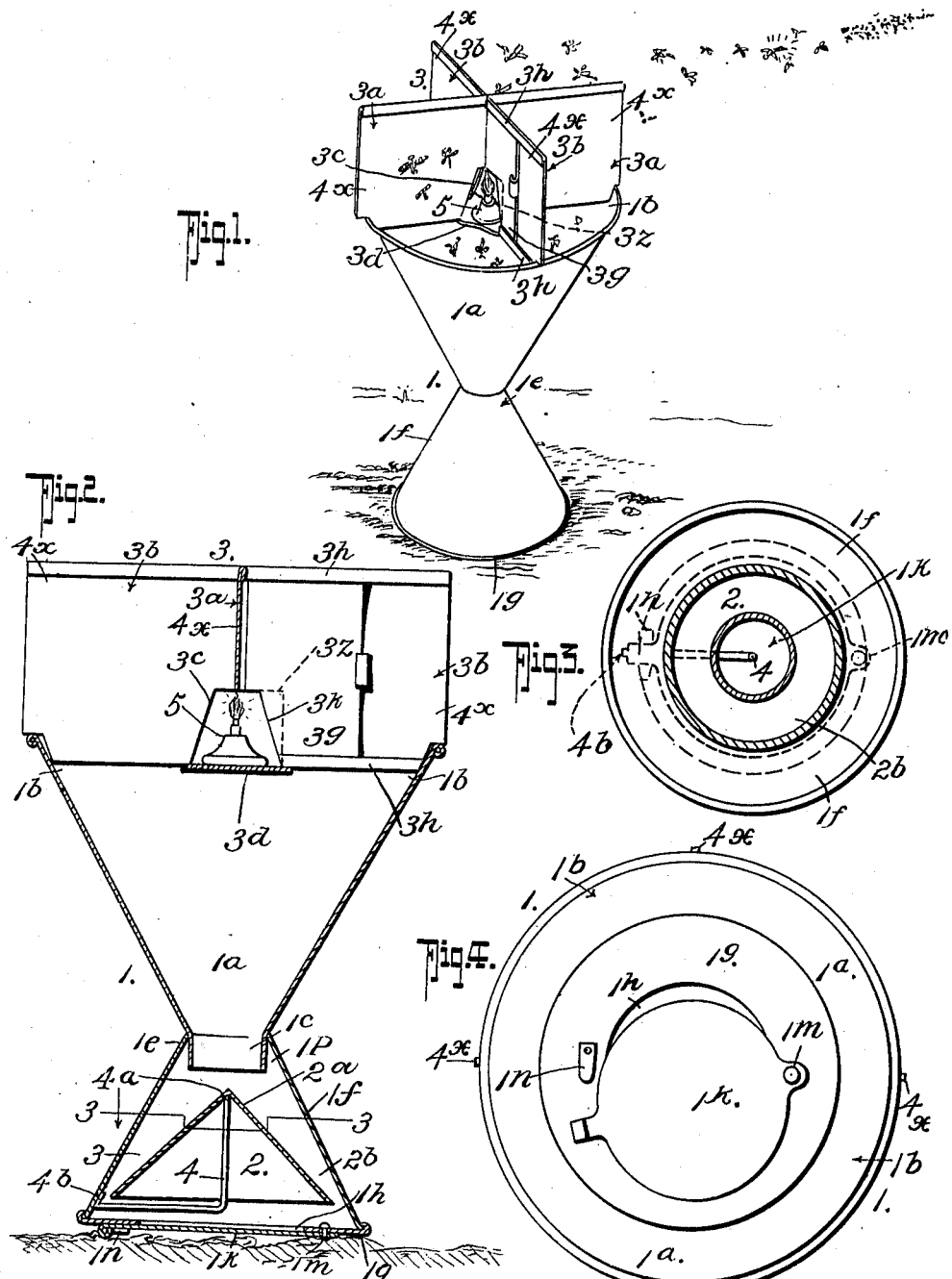

FRANCIS M. LA BAUM, OF DEL RIO, TEXAS.

INSECT-TRAP.

988,476.  Specification of Letters Patent.  Patented Apr. 4, 1911.

Application filed June 27, 1910. Serial No. 569,231.

*To all whom it may concern:*

Be it known that I, FRANCIS M. LA BAUM, residing at Del Rio, in the county of Valverde and State of Texas, have invented certain new and useful Improvements in Insect-Traps, of which the following is a specification.

My invention relates to certain new and useful improvements in insect traps or exterminators, and in its generic nature the invention comprises a receptacle preferably formed in the nature of a double truncated cone, over the mouth of which receptacle a set of wings is placed, in which a lamp is held to attract the insects toward the same.

The receptacle includes provisions for trapping the insects and retaining the same after they have been attracted by the light and come in contact with the wings.

Primarily my invention has for its object to provide an insect trap constructed along the lines hereinbefore stated, which will be of a very simple and effective construction and will readily serve its intended purposes.

In its more subordinate nature the invention comprises certain novel constructive features, arrangement and design of parts, all of which will be first described in detail and then be specifically pointed out in the appended claims, reference being had to the accompanying drawings, in which:—

Figure 1, is a perspective view of my invention. Fig. 2, is a central, vertical longitudinal section thereof. Fig. 3, is a horizontal section on the line 3—3 of Fig. 2. Fig. 4, is an inverted plan view of the invention the gate being swung partly open.

Referring now to the accompanying drawings in which like letters and numbers of reference indicate like parts in all of the figures 1 designates the receptacle which comprises the upper or large conical frustum $1^a$ whose larger base is toward the top and forms the upper mouth $1^b$ of the member $1^a$. The lower or apex portion of the conical frustum $1^a$ terminates in a cylindrical flange $1^c$ which projects into the upper mouth $1^e$ of the lower cone $1^f$ whose base $1^g$ has an enlarged aperture $1^h$ closable by a gate $1^k$ hingedly secured to the base $1^g$, as at $1^m$ and latched as at $1^n$, as shown.

The lower conical frustum $1^f$ has its larger base at the bottom and its smaller base toward the top so that the apex portions of the members $1^a$ and $1^f$ will contact one another, the flange $1^c$ projecting into the member $1^f$, as before stated, to leave a space $1^p$ therebetween.

Within the lower conical frustum $1^f$ I dispose a conical baffle 2 whose apex $2^a$ projects upwardly near to the cylindrical spout $1^c$ of the member $1^a$, and whose base portion $2^b$ is held slightly above the bottom $1^g$ of the member $1^f$ by a support 4 which consists of a stout wire soldered or otherwise secured at $4^a$ to the member 2 and also secured at $4^b$ in a similar manner to the member $1^f$, it being understood that the diameter of the bottom $2^b$ of the baffle 2 is greater than that of the aperture $1^h$ of the base $1^g$.

3 designates the wing member which consists of a pair of wings $3^a$—$3^b$ which cross one another at right angles, as shown, so as to leave a series of four wing portions $4^x$ disposed radially around the central vertical axis of the casing 1 and the wings $4^x$ are cut away as at $3^c$ and provided with a platform $3^d$, as shown, to receive the lamp or other light giving medium 5, as indicated, one of the wings $4^x$ being cut away as at $3^z$ to permit insertion of the lamp 5 and this cut away portion $3^z$ is normally covered by a slide $3^g$ which operates in slideways $3^h$ on the wing so that when the slide is pushed inwardly the cutaway portion $3^c$ of the wings will be of the same form and thereby hold the lamp 5 in place it being understood that the slide $3^g$ has a cutaway portion $3^k$ corresponding to that $3^c$ of the other wings.

In the practical application of my invention the insects being attracted by the light 5 fly toward the same and with more or less velocity impinge against the wings $4^x$ and are momentarily stunned, thus dropping down into the funnel shaped member $1^a$, and from thence into the lower member $1^f$ which constitutes the trap portion of the casing 1, the baffle 2 throwing the insect to one side of the axial line of the casing so that no direct light will be apparent to the insects since the platform $3^d$ is of such area that perpendicular lines drawn from the edges thereof downwardly will not pass through the funnel shaped portion $1^c$, and hence the chamber within the member $1^f$ will at all times be dark. The insects, should they attempt to crawl up the sides of the casing $1^f$, will enter the pocket $1^p$ and thus be unable to pass out and should they fly up into the funnel 2 they will, of course, be limited in their flight by the walls thereof and escape in this direction rendered impossible.

By making the baffle 2 with its base 2ᵇ of larger diameter than that of the spout 1ᶜ any insects on the base or floor 1ᵍ of the casing portion 1ᶠ will not be able to see any light through the funnel 1ᶜ, and hence will not be attracted thereby.

From the foregoing description taken in connection with the accompanying drawings, it is thought the complete construction, operation and numerous advantages of my invention will be readily understood by those skilled in the art to which the invention appertains, and I desire to say that many slight changes in the detail construction, combination and arrangement of parts may be made without departing from the spirit of my invention or the scope of the appended claims.

What I claim is:—

1. An insect trap comprising a casing consisting of a pair of double conical members joined at their ends of lesser diameter, a set of crossed wings supported by the upper conical member, a light carried by said crossed wings and means preventing direct rays of light entering the lower conical member, and means in the lower conical member for retaining the insects therein.

2. An insect trap comprising a casing, a trap portion, a funnel shaped member connected with said trap portion for directing the insects thereinto, a baffle cone within said trap portion, said trap portion having a discharge outlet, a door normally closing said discharge outlet, combined with a plurality of wings supported by the funnel member, said wings having a cutaway portion and a platform adapted to receive a light, means carried by said wings for retaining said light on said platform, substantially as shown and described.

3. An insect trap comprising a casing, a trap portion, a funnel shaped member connected with said trap portion for directing the insects thereinto, a baffle cone within said trap portion, and spaced from the walls thereof, said trap portion having a discharge outlet, a door normally closing said discharge outlet, combined with a plurality of wings supported by the funnel member, said wings having a cutaway portion and a platform adapted to receive a light, means carried by said wings for retaining said light on said platform, substantially as shown and described.

4. An insect trap comprising a casing, a trap portion, a funnel shaped member connected with said trap portion for directing the insects thereinto, a baffle cone within said trap portion, said trap portion having a discharge outlet, a door normally closing said discharge outlet, combined with a plurality of wings supported by the funnel member, said wings having a cutaway portion and a platform adapted to receive a light, means carried by said wings for retaining said light on said platform, said last named means comprising a slide carried by one of the wings for coöperatively engaging the lamp, said slide carrying wing having a cutaway portion partly closable by said slide at times.

5. In an apparatus of the class described, a casing comprising an upper and a lower conical portion, the upper conical portion being of funnel shape and provided with a spout portion projecting into the lower conical portion to leave a space therebetween, a conical baffle held within said lower portion and spaced from the walls thereof, said lower portion having a discharge aperture a gate normally closing said discharge aperture, a pair of crossed wings removably mounted on the upper conical portion of the casing, said wings each having a cutaway portion of like form at the crossed edges thereof, a lamp supporting platform carried by said wings adjacent said cutaway portion, said platform being of a greater diameter than that of the spout portion of the upper conical section and means for retaining a lamp on said platform, substantially as shown and described.

6. In an apparatus of the class described, a casing comprising an upper and a lower conical portion, the upper conical portion being of funnel shape and provided with a spout portion projecting into the lower conical portion to leave a space therebetween, a conical baffle held within said lower portion and spaced from the walls thereof, said lower portion having a discharge aperture, a gate normally closing said discharge aperture, a pair of crossed wings removably mounted on the upper portion of the casing, said wings each having a cutaway portion of like form at the crossed edges thereof, a lamp supporting platform carried by said wings adjacent said cutaway portion, said platform being of a greater diameter than that of the spout portion of the upper conical portion, means for retaining a lamp on said platform, said means comprising a slide carried by one of said wings and having a cutaway portion to correspond with that of the other wings, said slide carrying wing having a cutaway portion of greater area than that of the other wings, substantially as shown and described.

FRANCIS M. LA BAUM.

Witnesses:
A. E. DIETREICH,
ELEANOR MACCORMICK.

Copies of this patent may be obtained for five cents each, by addressing the "Commissioner of Patents, Washington, D. C."